US012090659B2

(12) United States Patent
Norberg Ohlsson

(10) Patent No.: US 12,090,659 B2
(45) Date of Patent: *Sep. 17, 2024

(54) TABLE, A METHOD AND A SYSTEM FOR HANDLING BEAM-CUT PARTS

(71) Applicant: TOMOLOGIC AB, Stockholm (SE)

(72) Inventor: Magnus Norberg Ohlsson, Stockholm (SE)

(73) Assignee: TOMOLOGIC AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,070

(22) Filed: Jul. 31, 2023

(65) Prior Publication Data

US 2023/0379313 A1    Nov. 23, 2023

Related U.S. Application Data

(63) Continuation of application No. 16/766,866, filed as application No. PCT/SE2018/051010 on Oct. 3, 2018, now Pat. No. 11,752,624.

(30) Foreign Application Priority Data

Dec. 14, 2017  (SE) .................... 1751548-7

(51) Int. Cl.
*B25J 9/16* (2006.01)
*B21D 43/10* (2006.01)
(Continued)

(52) U.S. Cl.
CPC .......... *B25J 9/1612* (2013.01); *B21D 43/105* (2013.01); *B23Q 7/046* (2013.01); *B25J 9/0084* (2013.01);
(Continued)

(58) Field of Classification Search
None
See application file for complete search history.

(56) References Cited

U.S. PATENT DOCUMENTS

| 2004/0144762 | A1  | 7/2004 | Franz et al. |
| 2014/0079524 | A1* | 3/2014 | Shimono .......... G05B 19/41815 414/801 |
| 2014/0277711 | A1* | 9/2014 | Tomo .................. B25J 15/0616 700/245 |

FOREIGN PATENT DOCUMENTS

| EP | 2 177 293 A1 | 4/2010 |
| EP | 2 722 114 A1 | 4/2014 |

(Continued)

*Primary Examiner* — Jaime Figueroa
*Assistant Examiner* — Arslan Azhar
(74) *Attorney, Agent, or Firm* — Mark P. Stone

(57) ABSTRACT

A table (122) for holding a beam-cut piece of material (204) including at least one beam-cut part (202). The table (122) comprises a holder (114) holding a raster structure (120) configured to hold the beam-cut piece of material (204). The raster structure (120) comprises raster sections (802) comprising parallel members (804). The table (122) comprises a movable rib structure (902). The rib structure (902) comprises ribs (904). At least one of the ribs (904) is movable between two neighbouring members (804). The rib structure (902) lifts the at least one part (202), or the beam-cut piece of material (204), or a section (208) of the beam-cut piece of material including at least one part of the beam-cut piece of material, or a remainder (206) of the beam-cut piece of material from a resting position on the raster section (802). The rib structure (904) holds the at least one part (202), or the beam-cut piece of material (204), or the section (208) of the beam-cut piece of material, or the remainder (206) of the beam-cut piece of material.

20 Claims, 8 Drawing Sheets

(51) Int. Cl.
  *B23Q 7/04* (2006.01)
  *B25J 9/00* (2006.01)
  *B25J 15/00* (2006.01)
  *B25J 15/06* (2006.01)
  *B60R 16/023* (2006.01)
  *G06K 19/07* (2006.01)
  *H04L 9/40* (2022.01)
  *H04L 12/403* (2006.01)
  *H04W 12/06* (2021.01)
  *H04W 12/108* (2021.01)
  *H04L 12/40* (2006.01)

(52) U.S. Cl.
  CPC .......... *B25J 9/0096* (2013.01); *B25J 9/1682* (2013.01); *B60R 16/0231* (2013.01); *G06K 19/0723* (2013.01); *H04L 12/403* (2013.01); *H04L 63/08* (2013.01); *H04W 12/06* (2013.01); *H04W 12/108* (2021.01); *B25J 15/0028* (2013.01); *B25J 15/06* (2013.01); *H04L 2012/40215* (2013.01); *H04L 2012/40273* (2013.01)

(56) References Cited

FOREIGN PATENT DOCUMENTS

| | | |
|---|---|---|
| EP | 3 093 078 A1 | 11/2016 |
| JP | 7 108 499 A2 | 4/1995 |
| JP | 2006 122 931 A1 | 5/2006 |

\* cited by examiner

TABLE, A METHOD AND A SYSTEM FOR HANDLING BEAM-CUT PARTS

TECHNICAL FIELD

Aspects of the present invention relate to a table and methods for handling beam-cut parts cut out of a piece of material. Further aspects of the present invention relate to a system for handling beam-cut parts cut out of a piece of material.

BACKGROUND

There are various machining and cutting technologies available to cut parts out of a sheet or plate material. The parts may be cut out by e.g. beam cutting. Beam cutting is defined as having some kind of beam as the cutting means, such as laser cutting, plasma cutting, ion beam cutting, flame or torch cutting, water cutting, or air cutting. Beam cutting may include so-called common cut and cluster cutting. Other examples of machining and cutting methods are e.g. sawing and milling.

SUMMARY OF ASPECTS OF THE INVENTION

The inventor of the present invention has identified a need to improve the handling of beam-cut parts cut out of a piece of material and make the process more efficient.

The object of the present invention is thus to improve the process of handling, or managing, beam-cut piece of material.

The above-mentioned object of the present invention is attained by providing a table for holding a beam-cut piece of material including at least one beam-cut part, the piece of material being beam-cut in beam-cutting equipment, wherein the table comprises a holder configured to hold a raster structure, the raster structure being configured to hold the beam-cut piece of material in a substantially horizontal plane, wherein the raster structure comprises a plurality of raster sections, each raster section comprising at least a plurality of members extending substantially parallel to one another, wherein the table comprises a rib structure movable in relation to the raster sections, wherein the rib structure comprises a plurality of ribs, at least one of the plurality of ribs being movable between two neighbouring members of the raster section, wherein the rib structure is configured to lift the at least one part, or the beam-cut piece of material, or a section of the beam-cut piece of material including at least one part of the beam-cut piece of material, or a remainder of the beam-cut piece of material from the resting position on the raster section in a vertical direction substantially perpendicular to the horizontal plane, and wherein the rib structure is configured to hold the at least one part, or the beam-cut piece of material, or the section of the beam-cut piece of material, or the remainder of the beam-cut piece of material. By means of this table, the handling of the of beam-cut parts is further improved, and the production of cut pieces is made more efficient. By means of the table, any mechanical locking effect between the parts and the remainder of the beam-cut piece of material is minimized. The table may be movable, for e.g. slidable along guiding means, or movable by way of wheels, to one or several separation zones. Each member may have a sawtooth shape or a flat shape.

According to an advantageous embodiment of the table according to the present invention, the rib structure is configured to move the ribs from below upwards before lifting the beam-cut piece of material, or the at least one part of the beam-cut piece of material, or the section of the beam-cut piece of material, or the remainder of the beam-cut piece of material from the resting position on the raster section. By means of this embodiment, the handling of the of beam-cut parts is further improved.

According to an advantageous embodiment of the table according to the present invention, the ribs extend substantially parallel to the horizontal plane, and wherein at least one of the plurality of ribs is movable between two neighbouring members of the raster section in a direction substantially perpendicular to the horizontal plane. By means of this embodiment, the handling of the of beam-cut parts is further improved.

According to a further advantageous embodiment of the table according to the present invention, the plurality of ribs comprises at least one first rib and at least one second rib, wherein the first and second ribs are vertically movable in relation to one another. By means of this embodiment, the handling of the of beam-cut parts is further improved.

According to another advantageous embodiment of the table according to the present invention, the plurality of ribs is grouped into at least a first group of a plurality of ribs and a second group of a plurality of ribs, wherein the ribs of the first group are vertically movable in relation to the ribs of the second group, and wherein the rib structure is configured to vertically lift and hold the at least one part, or the beam-cut piece of material, or the section of the beam-cut piece of material, or the remainder of the beam-cut piece of material by means of the first group. The plurality of ribs may be grouped into at least a first group of a plurality of ribs, a second group a plurality of ribs, and a third group a plurality of ribs. The plurality of ribs may be grouped into at least a first group of a plurality of ribs, a second group a plurality of ribs, a third group a plurality of ribs and a fourth group a plurality of ribs, or more. By means of this embodiment, the handling of the of beam-cut parts is further improved.

According to yet another advantageous embodiment of the table according to the present invention, the rib structure is configured to vertically lift and hold the at least one part, or the beam-cut piece of material, or the section of the beam-cut piece of material, or the remainder of the beam-cut piece of material by means of the first group while letting the second group rest. By means of this embodiment, the handling of the of beam-cut parts is further improved.

According to still another advantageous embodiment of the table according to the present invention, the rib structure is configured to vertically move the second group upwards to a predetermined level vertically below the first group but vertically above the members of the raster section. By means of this embodiment, the handling of the of beam-cut parts is further improved.

According to an advantageous embodiment of the table according to the present invention, the length of each rib essentially corresponds to the length of each member of the raster section. However, the length of the rib may vary. For example, in one embodiment, a plurality of short ribs is provided and divided into a plurality of groups. By means of these embodiments, the handling of the of beam-cut parts is further improved.

According to a further advantageous embodiment of the table according to the present invention, at least one rib is configured to be magnetized and become magnetic. By means of this embodiment, the handling of the of beam-cut parts is further improved.

According to another advantageous embodiment of the table according to the present invention, at least one of the plurality of ribs is configured to scrape off slag of the respective member of the raster section when being moved in relation to the respective member. By means of this embodiment, the table is maintained while handling the beam-cut pieces.

According to yet another advantageous embodiment of the table according to the present invention, at least one of the plurality of ribs has at least one corner configured to scrape off slag of the respective member, wherein the corner is made of a material which is harder than the material of the rest of the rib. By means of this embodiment, the table is maintained while handling the beam-cut pieces.

According to still another advantageous embodiment of the table according to the present invention, the hard material corner of the rib is replaceable. By means of this embodiment, the table is maintained while handling the beam-cut pieces.

According to a further advantageous embodiment of the table according to the present invention, each rib has a rectangular cross-section. However, other cross-sections are possible, e.g. circular.

According to another advantageous embodiment of the table according to the present invention, the table comprises a rib structure robot configured to control and guide the rib structure. By means of this embodiment, the handling of the of beam-cut parts is further improved.

According to still another advantageous embodiment of the table according to the present invention, the table comprises fasteners for fastening the beam-cut piece of material to the raster structure or section. By means of this embodiment, the handling of the of beam-cut parts is improved.

According to yet another advantageous embodiment of the table according to the present invention, at least one rib comprises at least one pin which extends substantially transversely to the longitudinal extension of the rib and is vertically movable in relation to the rib, and wherein the pin is arranged to vertically move the at least one part, or the beam-cut piece of material, or the section of the beam-cut piece of material, or the remainder of the beam-cut piece of material in relation to the rib and in relation to the beam-cut piece of material, the at least one part, the section of the beam-cut piece of material or the remainder of the beam-cut piece of material. Alternatively, at least one rib comprises a plurality of pins. For example, at least one of the plurality of ribs may comprise a plurality of pins. By means of these embodiments, the handling of the of beam-cut parts is further improved.

The above-mentioned object of the present invention is attained by providing a system for handling beam-cut parts cut out of a piece of material, wherein the system comprises a table as defined above or below, and wherein the system comprises at least one gripping robot having a gripper which is configured to be controlled by the at least one robot, wherein the gripping robot is configured to grip the at least one part, or the beam-cut piece of material, or the section of the beam-cut piece of material, or the remainder of the beam-cut piece of material when the beam-cut piece of material, the section of the beam-cut piece of material, the remainder of the beam-cut piece of material or the at least one part is held by ribs of the rib structure. By means of this embodiment, the handling of the of beam-cut parts is further improved.

The above-mentioned object of the present invention is attained by providing a method for handling beam-cut parts cut out of a piece of material, on a table for holding a beam-cut piece of material including at least one beam-cut part, wherein the piece of material is beam-cut in beam-cutting equipment, wherein the table comprises a holder configured to hold a raster structure, the raster structure being configured to hold the beam-cut piece of material in a substantially horizontal plane, wherein the raster structure comprises a plurality of raster sections, the raster sections comprising at least a plurality of members extending substantially parallel to one another, wherein the table comprises a rib structure movable in relation to the raster sections, wherein the rib structure comprises a plurality of ribs, wherein the method comprises the steps of:

moving at least one of the plurality of ribs between two neighbouring members of the raster section;

lifting the at least one part, or the beam-cut piece of material, or a section of the beam-cut piece of material, or a remainder of the beam-cut piece of material from the resting position on the raster section in a vertical direction substantially perpendicular to the horizontal plane by means of the rib structure; and holding the at least one part, or the beam-cut piece of material, or the section of the beam-cut piece of material, or the remainder of the beam-cut piece of material by means of the rib structure.

Hereby, the handling of the of beam-cut parts is further improved. The technical effects of the embodiments of the method correspond to the corresponding embodiment of the table.

According to an advantageous embodiment of the method according to the present invention, the method is characterized by moving at least one of the plurality of ribs between two neighbouring members of the raster section in a direction substantially perpendicular to the horizontal plane.

According to a further advantageous embodiment of the method according to the present invention, the method is characterized by moving a first rib of the plurality of ribs and a second rib of the plurality of ribs in relation to one another.

According to another advantageous embodiment of the method according to the present invention, the plurality of ribs is grouped into at least a first group of a plurality of ribs and a second group of a plurality of ribs, characterized by moving the ribs of the first group in a vertical direction and in relation to the ribs of the second group, and vertically lift and hold the at least one part, or the beam-cut piece of material, or the section of the beam-cut piece of material, or the remainder of the beam-cut piece of material by means of the first group.

According to yet another advantageous embodiment of the method according to the present invention, the method is characterized by vertically lift and hold the at least one part, or the beam-cut piece of material, or the section of the beam-cut piece of material, or the remainder of the beam-cut piece of material by means of the first group while letting the second group rest.

According to still another advantageous embodiment of the method according to the present invention, the method is characterized by vertically moving the second group upwards to a predetermined level vertically below the first group but vertically above the members of the raster section by means of the rib structure.

According to an advantageous embodiment of the method according to the present invention, the method is characterized by magnetizing at least one rib.

According to a further advantageous embodiment of the method according to the present invention, the method is characterized by scraping off slag of the respective member of the raster section when moving at least one of the plurality of ribs in relation to the respective member. Alternatively or in addition thereto, a robot is provided, which is configured to remove slag or remaining material of the respective member of the raster section, or the respective rib. e.g. by means of a brush and/or pneumatic or compressed air.

According to another advantageous embodiment of the method according to the present invention, the method is characterized by moving the ribs from below upwards before lifting the beam-cut piece of material, or the at least one part of the beam-cut piece of material, or the section of the beam-cut piece of material, or the remainder of the beam-cut piece of material from the resting position on the raster section.

According to yet another advantageous embodiment of the method according to the present invention, the method is characterized by fastening the beam-cut piece of material to the raster structure or section by means of fasteners.

According to still another advantageous embodiment of the method according to the present invention, at least one rib comprises at least one pin which extends substantially transversely to the longitudinal extension of the rib, and the method is characterized by vertically moving the pin in relation to the rib and vertically moving the at least one part, or the beam-cut piece of material, or the section of the beam-cut piece of material, or the remainder of the beam-cut piece of material in relation to the rib and in relation to the beam-cut piece of material or the at least one part, or the section of the beam-cut piece of material, or the remainder of the beam-cut piece of material.

The above-mentioned object of the present invention is also attained by providing a method for handling beam-cut parts cut out of a piece of material, the method comprising the steps of:
  receiving the beam-cut piece of material from beam-cutting equipment, the beam-cut piece of material being situated on a supporting structure; and
  gripping at least one part of the beam-cut piece of material, or gripping the beam-cut piece of material, or gripping a section of the beam-cut piece of material including at least one part of the beam-cut piece of material or gripping a remainder of the beam-cut piece of material with the at least one part removed, by means of at least one gripper (e.g. a pincer or a claw) controlled by a gripping robot.

By using at least one gripper, e.g. two grippers, to grip the relevant material, an efficient handling of the relevant material is attained and the process of handling or managing beam-cut pieces of material is improved. By using at least one gripper, the at least one part, or the beam-cut piece of material, or the section of the beam cut piece of material, or the remainder of the beam-cut piece of material with the at least one part is efficiently released from the at least one part, or the beam-cut piece of material, or the section of the beam-cut piece of material, or the remainder of the beam-cut piece of material with the at least one part. By means of the present invention, parts with a complex contour can be efficiently handled. Parts cut from a relatively thick piece of material can be released from the beam-cut piece of material or remainder. Small parts can be efficiently handled. After cutting, parts attached to the remainder and parts attached to one another can be efficiently handled. The cut parts can be placed in a flexible manner. e.g. placed on a conveyer belt leading to the next the step the process. Human involvement in the process is reduced and limited. The pieces can be easily stacked or piled before next process step. The productivity of the beam-cutting equipment is increased. The production of cut pieces is made more efficient. Gripping by means of a gripper, e.g. in the form of a claw or a pair of pincers, does not correspond to the act of "pick and place" by way of vacuum or magnets. Beam cutting a sheet/piece of material can involve laser cutting, plasma cutting, ion beam cutting, flame or torch cutting, water cutting, or air cutting. The piece of material may be a sheet which may have various sizes, and may e.g have different thicknesses. The sheet may be called a plate. The sheet is in most cases a metal sheet, but may involve other materials.

According to an advantageous embodiment of the method according to the present invention, the method is characterized by the step of:
  releasing the at least one part, or the beam-cut piece of material, or the section of the beam-cut piece of material, or the remainder of the beam-cut piece of material with the at least one part removed at a separation zone by means of the at least one gripper.

According to another advantageous embodiment of the method according to the present invention, the method is characterized by the step of:
  moving the at least one part, or the beam-cut piece of material, or the section of the beam-cut piece of material, or the remainder of the beam-cut piece of material with the at least one part removed to the separation zone, e.g. by means of the at least one gripper.

By means of these embodiments, the process of handling or managing a beam-cut piece of material is further improved. The separation zone can be located close to the beam-cutting equipment/machine, or be placed at a longer distance from the beam-cutting equipment. A plurality of separation zones may be provided. Two pieces of beam-cutting equipment can share separation zone/-s. A beam-cutting equipment can be provided with a plurality of separation zones. Alternatively, a robot may be provided for moving the at least one part, or the beam-cut piece of material, or the section of the beam-cut piece of material, or the remainder of the beam-cut piece of material with the at least one part removed to a separation zone. The beam-cutting equipment may be associated with one or a plurality of separation zones. Alternatively, two pieces of beam-cutting equipment can be associated with the same separation zone. Alternatively, a rib structure may be provided, the rib structure being movable in relation to the supporting structure, wherein the rib structure comprises a plurality of ribs, wherein the rib structure is configured to lift the at least one part, or the beam-cut piece of material, or a section of the beam-cut piece of material including at least one part of the beam-cut piece of material, or a remainder of the beam-cut piece of material.

According to a further advantageous embodiment of the method according to the present invention, the step of gripping the at least one part, or the beam-cut piece of material, or the section of the beam-cut piece of material, or the remainder of the beam-cut piece of material with the at least one part removed is performed by means of two grippers controlled by at least one gripping robot. By means of this embodiment, the process of handling or managing beam-cut pieces of material is further improved.

According to another advantageous embodiment of the method according to the present invention, the step of gripping the at least one part, or the beam-cut piece of material, or the section of the beam-cut piece of material or the remainder of the beam-cut piece of material with the at least one part removed is performed by means of two separate gripping robots, each gripping robot being equipped with at least one gripper. By means of this embodiment, the process of handling or managing a beam-cut piece of material is further improved.

According to yet another advantageous embodiment of the method according to the present invention, the beam-cut piece of material comprises at least one beam-cut cluster of parts, and in that the beam-cut cluster of parts is received from the beam-cutting equipment. The inventive method is efficient and useful for beam-cut clusters of parts.

According to still another advantageous embodiment of the method according to the present invention, the method is characterized by receiving parts which are joined to one another by micro joints and/or receiving at least one part which is joined to a remainder of the piece of material by micro joints. The inventive method is efficient and useful for beam-cut clusters of parts.

According to an advantageous embodiment of the method according to the present invention, the method is characterized by gripping at least one micro joint part or the micro joint remainder of the piece of material by means of the at least one gripper in such a way that a micro joint part is released from another micro joint part and/or from the micro joint remainder. The inventive method is efficient and useful for beam-cut clusters of parts.

According to an advantageous embodiment of the method according to the present invention, the micro joint part is released from another micro joint part and/or from the micro joint remainder by bending or rotating the respective micro joint in relation to another part and/or the remainder of the piece of material by means of the gripper controlled by the at least one gripping robot. The inventive method is efficient and useful for beam-cut clusters of parts, whereby the handling or managing of a beam-cut piece of material is further improved. Alternatively, the micro joint part is released from another micro joint part and/or from the micro joint remainder by bending or rotating the respective micro joint in relation to another part and/or the remainder of the piece of material by means of a pick-and-place robot using vacuum or magnets for picking and placing.

According to a further advantageous embodiment of the method according to the present invention, in order to prepare the release of a micro joint part from another part and/or the micro joint remainder, a micro joint part is pushed upward or downward in relation to the other part and/or the micro joint remainder by means of a robot. By this embodiment, the handling or managing of a beam-cut piece of material is further improved.

According to a further advantageous embodiment of the method according to the present invention, the method is characterized in by gripping the micro joint remainder by means of at least one gripper controlled by the at least one gripping robot to facilitate the release of the at least one micro joint part from the micro joint remainder. By this embodiment, the handling of a beam-cut piece of material is further improved.

According to another advantageous embodiment of the method according to the present invention, the method is characterized by gripping the at least one part of the beam-cut piece of material or the remainder of the beam-cut piece of material in such a way that at least one part is released from another part and/or from the remainder. By this embodiment, the handling or managing of a beam-cut piece of material is improved.

According to yet another advantageous embodiment of the method according to the present invention, a part is released from another part and/or from the remainder by rotating a part in relation to another part and/or the remainder of the piece of material by means of the gripper controlled by the at least one gripping robot. By this embodiment, the handling or managing of a beam-cut piece of material is further improved.

According to yet another advantageous embodiment of the method according to the present invention, in order to prepare the release of a part from another part and/or the remainder, a part is pushed upward or downward or sideways in relation to the other part and/or the remainder by means of a robot. By this embodiment, the handling or managing of a beam-cut piece of material is further improved.

According to an advantageous embodiment of the method according to the present invention, the method is characterized by gripping the remainder by means of at least one gripper controlled by the at least one gripping robot to facilitate the release of the at least one part from the remainder. By this embodiment, the handling or managing of a beam-cut piece of material is improved.

According to another advantageous embodiment of the method according to the present invention, the method is characterized by receiving the beam-cut piece of material situated on a support structure which is in the form of a raster structure, the raster structure comprising a plurality of flat members extending substantially parallel to one another. Each flat member may have a sawtooth shape. By this embodiment, the handling of the beam-cut piece of material is further improved.

According to yet another advantageous embodiment of the method according to the present invention, the method is characterized by receiving the beam-cut piece of material situated on a support structure which is in the form of a raster structure, the raster structure forming a grid. The raster structure may have other shapes and forms. By this embodiment, the handling of beam-cut pieces of material is further improved.

According to still another advantageous embodiment of the method according to the present invention, the gripping by means of the gripper is combined with picking and placing by means of a pick-and-place robot using vacuum or magnets for picking and placing the at least one part of the beam-cut piece of material, or the beam-cut piece of material, or the section of the beam-cut piece of material or the remainder of the beam-cut piece of material. By this embodiment, the handling of beam-cut pieces of material is further improved.

According to still an advantageous embodiment of the method according to the present invention, the step of gripping the at least one part, or the beam-cut piece of material, or the section of the beam-cut piece of material or the remainder of the beam-cut piece of material with the at least one part removed is performed by means of at least one gripper in the form of a claw or a pair of pincers or a plurality of jaws.

The above-mentioned object of the present invention is also attained by providing a system for handling beam-cut parts cut out of a piece of material, wherein the system comprises at least one gripping robot having at least one gripper controlled by the at least one gripping robot, wherein the system comprises a holder for receiving a supporting structure, which holds the beam-cut piece of material, from beam-cutting equipment and holding the support structure, and wherein the gripping robot is arranged to grip at least one part of the beam-cut piece of material, or grip the beam-cut piece of material, or grip a section of the beam-cut piece of material including at least one part of the beam-cut piece of material or grip a remainder of the beam-cut piece of material, by means of the at least one gripper. Positive technical effects of the system according to the present invention, and its embodiments, correspond to the technical effects mentioned in connection with the method according to the present invention, and its embodiments.

According to an advantageous embodiment of the system according to the present invention, the system is configured to perform the above-mentioned and below-mentioned steps of the method.

According to a further advantageous embodiment of the system according to the present invention, the at least one gripping robot is arranged above the supporting structure. By this embodiment, the handling of beam-cut parts is further improved.

According to another advantageous embodiment of the system according to the present invention, the system comprises a table provided with the holder for holding a raster structure, the raster structure being configured to hold the beam-cut piece of material in a substantially horizontal plane, wherein the raster structure comprises a plurality of elongated members extending substantially parallel to one another, wherein the table comprises a rib structure movable in relation to the raster structure, wherein the rib structure comprises a plurality of ribs extending substantially parallel to the horizontal plane, at least one of the plurality of ribs being movable between two neighbouring members of the raster structure in a direction substantially perpendicular to the horizontal plane, and wherein the rib structure is configured to lift and hold at least one part of the beam-cut piece of material, or the beam-cut piece of material, or the section of the beam-cut piece of material, or the remainder of the beam-cut piece of material from the resting position on the raster structure in a direction substantially perpendicular to the horizontal plane, wherein the gripping robot is configured to grip at least one part of the beam-cut piece of material, or the beam-cut piece of material, or the section of the beam-cut piece of material, or the remainder of the beam-cut piece of material when the at least one part of the beam-cut piece of material, or the beam-cut piece of material, or the section of the beam-cut piece of material, or a remainder of the beam-cut piece of material is held by ribs of the rib structure. By means of this embodiment, the handling of the of beam-cut parts is further improved. By means of this table, any mechanical locking effect between the parts and the remainder of the beam-cut piece of material is minimized. According to yet another advantageous embodiment of the system according to the present invention, the system comprises a table as defined above or below, wherein the system comprises a pick-and-place robot using vacuum or magnets for picking and placing the at least one part of the beam-cut piece of material, or the beam-cut piece of material, or the section of the beam-cut piece of material or the remainder of the beam-cut piece of material. By means of this embodiment, the handling of the of beam-cut parts is further improved. The innovative ribs reduce the mechanical locking effect between the parts and the remainder of the beam-cut piece of material which facilitates the function of the pick-and-place robot. According to yet another advantageous embodiment of the system according to the present invention, the system comprises a table as defined above or below, wherein the table is movable, for e.g. slidable along guiding means, or movable by way of wheels, to one or several separation zones. According to another advantageous embodiment of the system according to the present invention, the system comprises a plurality of tables of the kind defined above or below.

According to yet another advantageous embodiment of the system according to the present invention, the gripping robot is configured to hold the at least one part of the beam-cut piece of material, or the beam-cut piece of material, or the section of the beam-cut piece of material, or a remainder of the beam-cut piece of material by pressing the at least one part of the beam-cut piece of material, or the beam-cut piece of material, or the section of the beam-cut piece of material or a remainder of the beam-cut piece of material against ribs of the rib structure. By means of this embodiment, the handling of the of beam-cut parts is further improved.

According to yet another advantageous embodiment of the system according to the present invention, the gripper is in the form of a claw or a pair of pincers or a plurality of jaws.

Further, the above-mentioned object of the present invention is attained by providing at least one computer program product directly loadable into the internal memory of at least one digital computer, comprising software code portions for performing the steps of the method according to any of the above-mentioned or below-mentioned embodiments when said at least one product is/are run on said at least one computer, by providing a non-transient computer-readable storage medium containing data representing coded instructions configured for execution by a processor of a computer, the instructions comprising the steps of a method according to any of the above-mentioned or below-mentioned embodiments.

The above-mentioned object of the present invention is also attained by providing a non-transient computer-readable storage medium containing data representing coded instructions configured for execution by a processor of a computer, the instructions comprising the steps of a method according to any of the above-mentioned or below-mentioned embodiments.

The above-mentioned features and embodiments of the methods, systems, table, computer program product, respectively, may be combined in various possible ways providing further advantageous embodiments.

Further advantageous embodiments of the methods, systems, table, computer program products, respectively, according to the present invention and further advantages with the embodiments of the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

Figure 1:
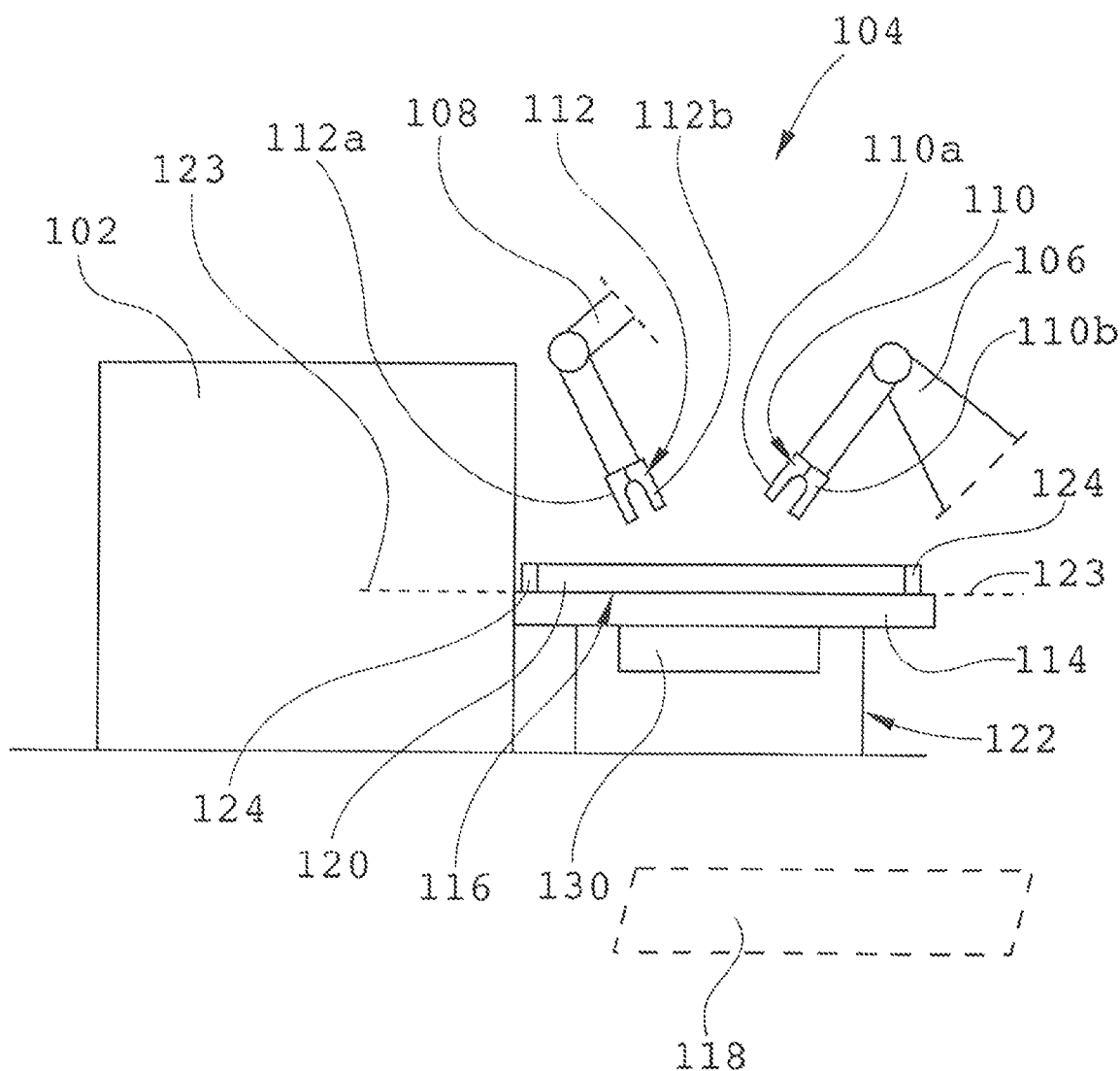
FIG. 1 is a schematic diagram illustrating a system for handling beam-cut pieces.

In FIG. 1 beam-cutting equipment 102 is schematically illustrated. The beam-cutting equipment 102 cuts material by using a beam, e.g. laser cutting, plasma cutting, ion beam cutting, flame or torch cutting, water cutting, or air cutting. FIG. 1 further illustrates aspects of a system 104 for handling beam-cut parts 202, 304 (see FIGS. 2 and 3), and clusters with and without micro joints, cut out of a piece of material 204, 302 according to the present invention. The system 104 comprises at least one gripping robot 106, e.g. two gripping robots 106, 108. Each gripping robot 106, 108 has at least one gripper 110, 112 controlled by the at least one gripping robot 106, 108. The gripper 110, 112 may be in the form of a claw. The gripper 110, 112 may be in the form of a pair of pincers 110a, 110b, 112a, 112b. The gripper 110, 112 may be in the form of a plurality of jaws 110a, 110b, 112a, 112b. The plurality of jaws may be two, three or more jaws. The system 104 comprises a holder 114 for receiving a supporting structure 116 from the beam-cutting equipment 102 and holding the support structure 116. The supporting structure 116 holds the beam-cut piece of material 204. The holder 114 may be arranged to lock the support structure 116 in position, so that the support structure 116 does not move in relation to the holder 114. Thus, the holder 114 may be arranged to fixate the support structure 116. The support structure 116 may be a raster structure 120. The gripping robots 106, 108 are arranged to grip at least one part 202 of the beam-cut piece of material 204, or grip the beam-cut piece of material 204, and/or grip a section 208 of the beam-cut piece of material 204 including at least one part 202 of the beam-cut piece of material 204 or grip a remainder 206 of the beam-cut piece of material 204, by means of the at least one gripper 110, 112. The at least one gripping robot 106, 108 is arranged above the supporting structure 116. The system 104 is configured to perform the steps of the embodiments of the method as disclosed above and below. The system 104 may comprises a table 122 as disclosed hereinafter.

Figure 4:
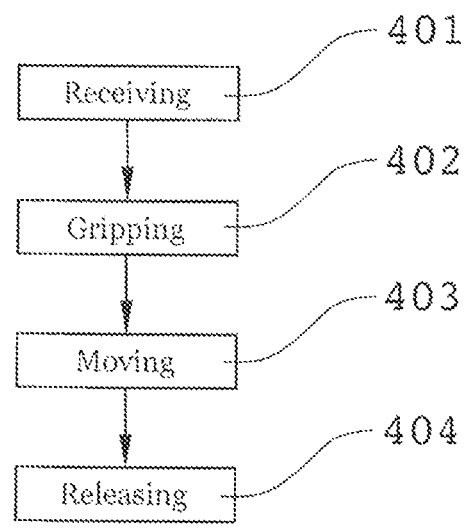
FIG. 4 is a flow diagram illustrating aspects of one of the methods according to the present invention.

FIG. 4 schematically illustrates aspects of the method for handling beam-cut parts 202 cut out of a piece of material 204 according to the present invention. The method comprising the steps of:

Receiving 401 the beam-cut piece of material 204 from beam-cutting equipment 102, the beam-cut piece of material 204 being situated on a supporting structure 116; and Gripping 402 at least one part 202 of the beam-cut piece of material 204, or gripping the beam-cut piece of material 204, or gripping a section 208 of the beam-cut piece of material including at least one part 202 of the beam-cut piece of material 204 or gripping a remainder 206 of the beam-cut piece of material 204 with the at least one part 202 removed, by means of at least one gripper 110, 112, e.g. two grippers 110, 112, controlled by one or two gripping robots 106, 108. As stated above, each gripper 1110, 112 may be in the form of a claw or a pair of pincers 110a, 110b, 112a, 112b or a plurality of jaws 110a, 110b, 112a, 112b.

The method may further comprise the steps of:

Moving 403 the at least one part 202, or the beam-cut piece of material 204, or the section 208 of the beam-cut piece of material 204, or the remainder 206 of the beam-cut piece of material 204 with the at least one part 202 removed to a separation zone 118 (see FIG. 1) by means of the at least one gripper 110, 112; and Releasing 404 the at least one part 202, or the beam-cut piece of material 204, or the section 208 of the beam-cut piece of material 204, or the remainder 206 of the beam-cut piece of material 204 with the at least one part 202 removed at the separation zone 118 by means of the at least one gripper 110, 112.

Advantageously, the method may include gripping the at least one part 202 of the beam-cut piece of material or the remainder 206 of the beam-cut piece of material 204 in such a way that at least one part 202 is released from another part 202 and/or from the remainder 206. A part 202 may be released from another part 202 and/or from the remainder 206 by rotating a part 202 in relation to another part 202 and/or the remainder 206 of the piece of material 204 by means of the gripper 110, 112 controlled by the at least one gripping robot 106, 108. In order to prepare the release of a part 202 from another part 202 and/or the remainder 206, a part 202 may be pushed upward or downward or sideways in relation to the other part 202 and/or the remainder 206 by means of a robot 106, 108. The method may include the step of gripping the remainder 206 by means of at least one gripper 110, 112 controlled by the at least one gripping robot 106, 108 to facilitate the release of the at least one part 202 from the remainder 206.

The beam-cut piece of material 302 may comprise at least one beam-cut cluster 303 of parts 304 (see FIG. 3), and in that the beam-cut cluster 303 of parts 304 is received from the beam-cutting equipment 102. The method may comprise the step of receiving parts 304 which are joined to one another by micro joints 306 and/or receiving at least one part 304 which is joined to a remainder 308 of the piece of material 302 by micro joints 306. The method may comprise the step of gripping at least one micro joint part 304 or the micro joint remainder 308 of the piece of material 302 by means of the at least one gripper 110, 112 in such a way that a micro joint part 304 is released from another micro joint part 304 and/or from the micro joint remainder 308. The micro joint part 304 may be released from another micro joint part 304 and/or from the micro joint remainder 308 by bending or rotating the respective micro joint 306 in relation to another part 304 and/or the micro joint remainder 308 by means of the gripper 110, 112 controlled by the at least one gripping robot 106, 108. In order to prepare the release of a micro joint part 304 from another micro joint part 304 and/or the micro joint remainder 308, a micro joint part 304 may be pushed upward or downward in relation to the other part 304 and/or the micro joint remainder 308 by means of a robot 106, 108. The micro joint remainder 308 may be gripped by means of at least one gripper 110, 112 controlled by the at least one gripping robot 106, 108 to facilitate the release of the at least one micro joint part 304 from the micro joint remainder 308

Figure 5:
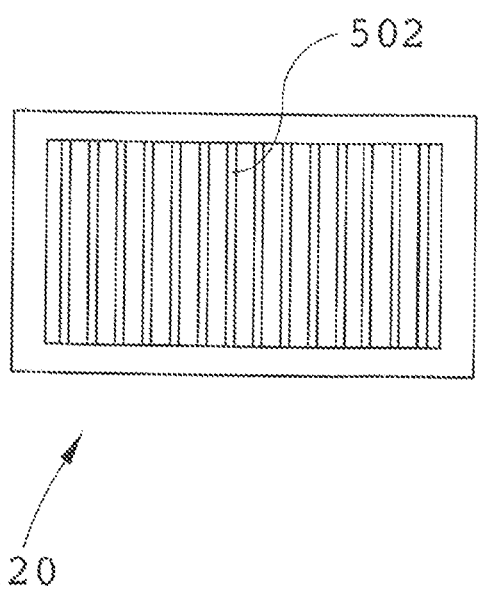
FIG. 5 is a top view schematically illustrating a raster structure.
Figure 13:
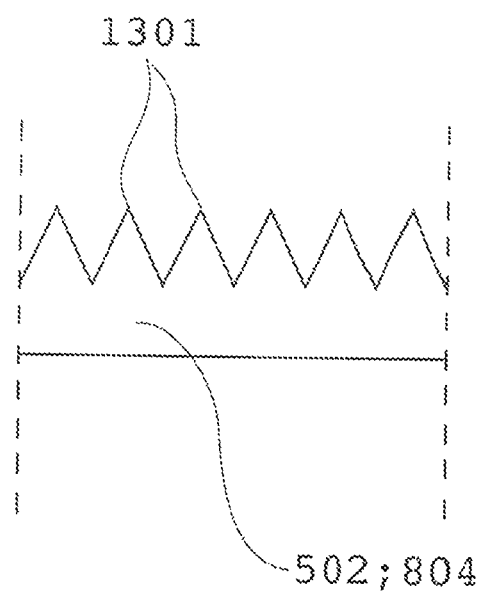
FIG. 13 is a schematic side view of an example of a member of a raster structure.

The method and system may be characterized by receiving the beam-cut piece of material 204 situated on a support structure 116 which is in the form of a raster structure 120 (see FIGS. 1 and 5). The raster structure 120 comprises a plurality of flat members 502 extending substantially parallel to one another. Each flat member 502 may have a flat shape or a sawtooth shape, e.g. as illustrated in FIG. 13. When each member 502 has a sawtooth shape, the beam-cut piece of material 204 rests on the tops 1301 of the sawtooth shape.

Figure 6:
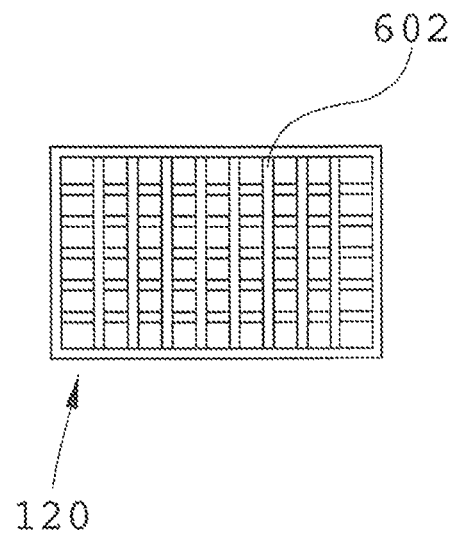
FIG. 6 is a top view schematically illustrating a raster structure.
Figure 7:
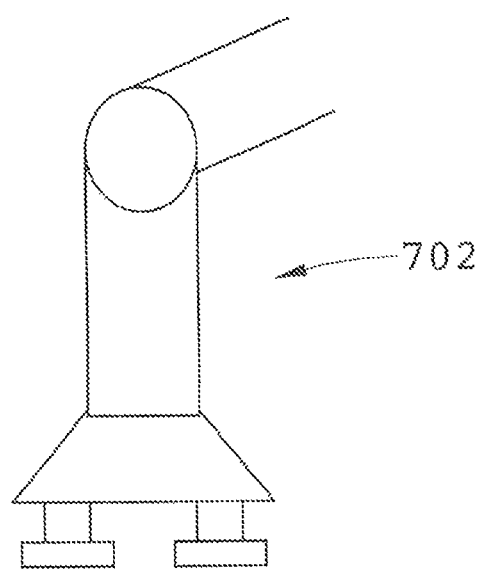
FIG. 7 is a schematic partial view of a robot.

Alternatively, as shown in FIG. 6, the method may be characterized by receiving the beam-cut piece of material 204 situated on a raster structure 120 that forms a grid 602. The gripping 402 by means of the gripper 110, 112 may be combined with picking and placing by means of a pick-and-place robot 702 (see FIG. 7) using vacuum or magnets for picking and placing the at least one part 202 of the beam-cut piece of material 204, or the beam-cut piece of material 204, or the section 208 of the beam-cut piece of material 204 or the remainder 206 of the beam-cut piece of material 204.

Figure 8:
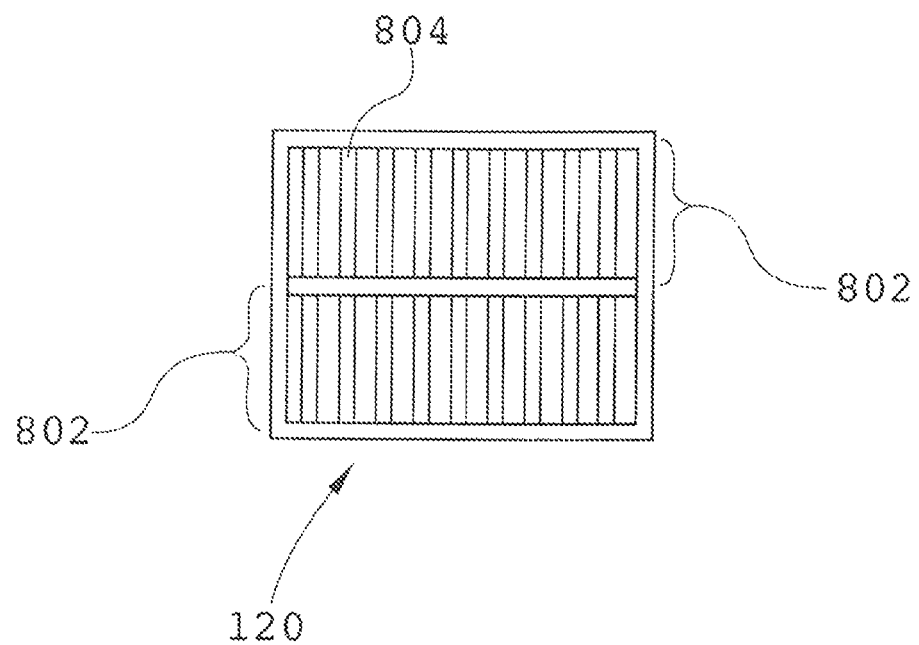
FIG. 8 is a top view schematically illustrating a raster structure.

With reference to FIG. 1, embodiments of a table 122 are shown for holding a beam-cut piece of material 204 including at least one beam-cut part 202, the piece of material being beam-cut in beam-cutting equipment 102. The table 122 comprises a holder 114 configured to hold a raster structure 120. The holder 114 may be configured to lock the raster structure 120 so that the raster structure 120 does not move in relation to the table 122. Thus, the holder 114 may be arranged to fixate the raster structure 120. The raster structure 120 is configured to hold the beam-cut piece of material 204 in a substantially horizontal plane 123. With reference to FIG. 8, the raster structure 120 may comprises a plurality of raster sections 802. Each raster section 802 comprises at least a plurality of members 804, e.g. flat members 804, extending substantially parallel to one another. The raster structure 120 in FIG. 8 includes four raster sections 802, but may comprise less or more raster sections 802. The raster sections 802 may be horizontal when in use. Each member 804 may have a flat shape or a sawtooth shape, e.g. as illustrated in FIG. 13. When each member 804 has a sawtooth shape, the beam-cut piece of material rests on the tops 1301 of the sawtooth shape. The raster structure 120 extends above the holder 114 (see FIG. 1), whereby vertical spaces are provided between the holder 114 and the tops 1301 of the sawtooth shape, for example.

The table 122 comprises a rib structure 902 movable in relation to the raster sections 802. The rib structure 902 may comprise a plurality of ribs 904, each rib 904 being movable between two neighbouring members 804 of the raster section 802. The rib structure 902 is configured to lift the at least one part 202, or the beam-cut piece of material 204, or a section 208 of the beam-cut piece of material 204 including at least one part 202 of the beam-cut piece of material 204, or a remainder 208 of the beam-cut piece of material 204 from the resting position on the raster section 802 in a vertical direction 906 substantially perpendicular to the horizontal plane 123. The rib structure 902 is configured to hold the at least one part 202, or the beam-cut piece of material 204, or the section 208 of the beam-cut piece of material, or the remainder 206 of the beam-cut piece of material 204. The ribs 904 may extend substantially parallel to the horizontal plane 123, and at least one of the plurality of ribs 904 may be movable between two neighbouring members 804 of the raster section 802 in a direction 906 substantially perpendicular to the horizontal plane 123 (see FIG. 1).

Figure 9:
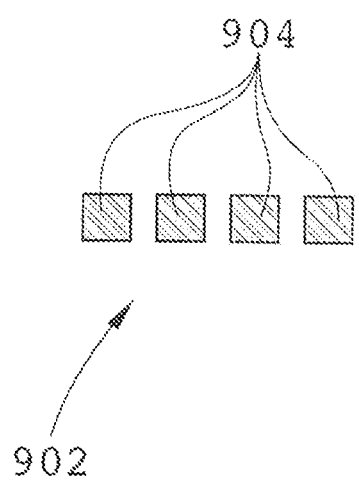
FIG. 9 is a schematic side view of an embodiment of the rib structure.
Figure 10:
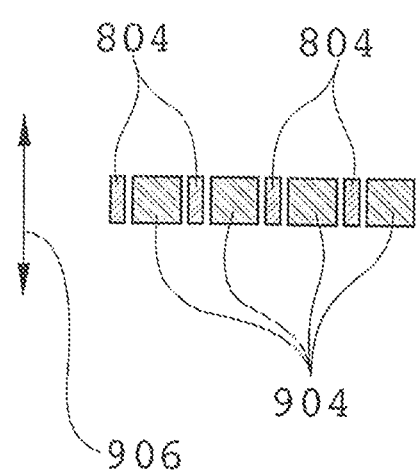
FIG. 10 is a schematic side view of an embodiment of the rib structure interacting with a raster section.

The plurality of ribs 904 comprises at least one first rib 904 and at least one second rib 904, wherein the first and second ribs 904 are vertically movable in relation to one another. The plurality of ribs 904 may be grouped into at least a first group of a plurality of ribs 904 and a second group of a plurality of ribs 904, wherein the ribs 904 of the first group are vertically movable in relation to the ribs 904 of the second group. With reference to FIGS. 9 and 10, the two ribs 904 in the middle may be part of the first group, and the two ribs 904 most to the left and to right, respectively, may be part of the second group, or vice versa, or they may be grouped in a different way. The rib structure 902 is configured to vertically lift and hold the at least one part 202, or the beam-cut piece of material 204, or the section 208 of the beam-cut piece of material 204, or the remainder 206 of the beam-cut piece of material 204 by means of the first group. The rib structure 902 is configured to vertically lift and hold the at least one part 202, or the beam-cut piece of material 204, or the section 208 of the beam-cut piece of material, or the remainder 206 of the beam-cut piece of material 204 by means of the first group while letting the second group rest. The rib structure 902 may be configured to vertically move the second group upwards to a predetermined level vertically below the first group but vertically above the members 804 of the raster section 802. The length of each rib 904 may essentially corresponds to the length of each member 804 of the raster section 802, but each rib 904 may be longer or shorter than the respective member 804 of the raster section 802. At least one rib 904 may be configured to be magnetized and become magnetic.

At least one of the plurality of ribs 904 may be configured to scrape off slag of the respective member 804 of the raster section 802 when being moved in relation to the respective member 804. At least one of the plurality of ribs 904 may have at least one corner 908 configured to scrape off slag of the respective member 804, wherein the corner 908 is made of a material which is harder than the material of the rest of the rib 904. The hard material corner 908 of the rib 904 is replaceable.

The rib structure 902 is advantageously configured to move the ribs 904 from below upwards before lifting the beam-cut piece of material 204, or the at least one part 202 of the beam-cut piece of material 204, or the section 208 of the beam-cut piece of material 204, or the remainder 206 of the beam-cut piece of material 204 from the resting position on the raster section 802. Thus, the ribs 904 come from below beneath the holder 114, enter between the members 804 in a vertical direction and then lift the beam-cut piece of material 204 or part/parts thereof. This vertical movement of the ribs 904 enables or facilitates the feature that the first and second ribs 904 are vertically movable in relation to one another, or that the ribs 904 of the first group are vertically movable in relation to the ribs 904 of the second group. This vertical movement of at least one rib 904 in relation to another rib 904 together with the above-mentioned step of gripping by means of at least one gripper 110, 112 provides for an efficient and advantageous handling of the relevant material and/or part, and the process of handling or managing beam-cut pieces of material is improved. For example, a part 202 of the beam-cut piece of material 204 can rest on three ribs 904, whereupon one of the ribs 904, e.g. the middle rib 904, is moved downward and space is provided for the gripper 110, 112 to grip said part 202. The innovative ribs 904 have the ability to co-operate with raster structures 120 and raster sections 802 of various designs.

In FIGS. 9 and 10, each rib has a rectangular cross-section. However, other forms are possible. e.g. a circular cross-section. The table 122 may comprise a rib-structure-robot configured to control and guide the rib structure 902. The table 122 may comprise fasteners 124 for fastening the beam-cut piece of material 204 to the raster structure 120 or raster section 802.

Figure 11:
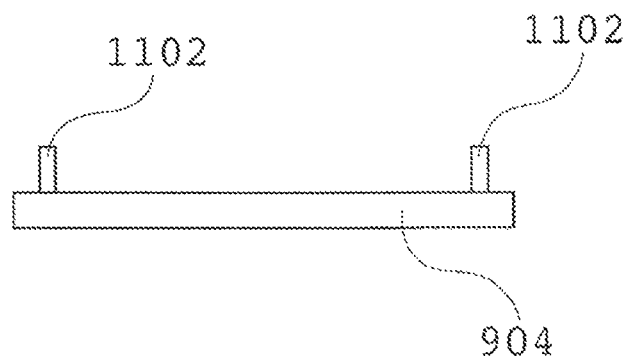
FIG. 11 is a schematic side view of an embodiment of the rib structure.

With reference to FIG. 11, at least one rib 904 may comprise at least one pin 1102 which extends substantially transversely to the longitudinal extension of the rib 904 and is vertically movable in relation to the rib 904. At least one of the plurality of ribs may comprise at least one pin 1102, e.g. a plurality of pins 1102. The pin 1102 is arranged to vertically move the at least one part 202, or the beam-cut piece of material 204, or the section 208 of the beam-cut piece of material 204, or the remainder 206 of the beam-cut piece of material 204 in relation to the rib 904 and in relation to the beam-cut piece of material 204, the at least one part 202, the section 208 of the beam-cut piece of material 204 or the remainder 206 of the beam-cut piece of material 204.

Figure 2:
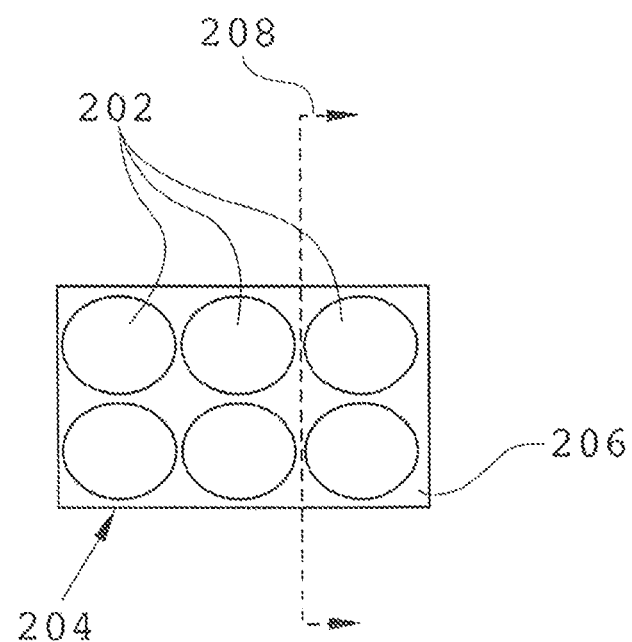
FIG. 2 is a top view schematically illustrating a beam-cut piece of material.
Figure 3:
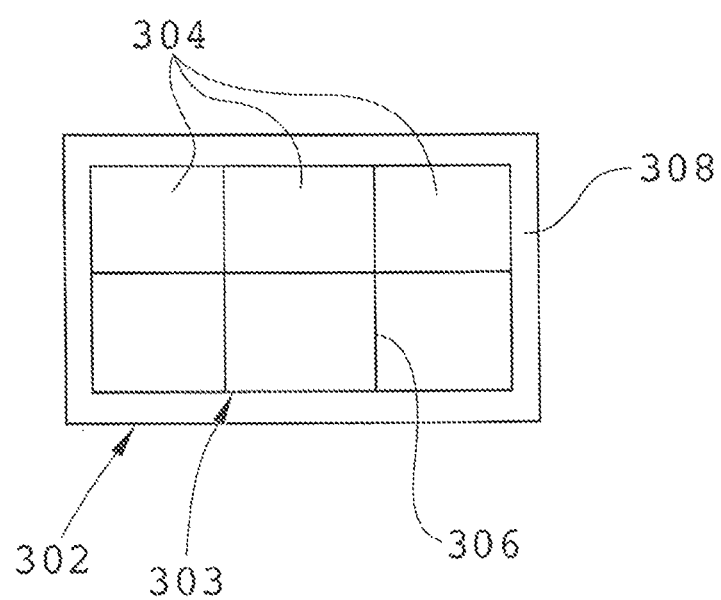
FIG. 3 is a top view schematically illustrating another version of a beam-cut piece of material.

With reference to FIGS. 1 and 2, the gripper 110, 112 is configured to be controlled by the at least one robot 106, 108, The gripping robot 106, 108 is configured to grip the at least one part 202, or the beam-cut piece of material 204, or the section 108 of the beam-cut piece of material 204, or the remainder 206 of the beam-cut piece of material 204 when the beam-cut piece of material 204, the section 208 of the beam-cut piece of material 204, the remainder 206 of the beam-cut piece of material or the at least one part 202 is held by the ribs 904 of the rib structure 902. Further, the gripping robot 106, 108 may be configured to hold the at least one part 202 of the beam-cut piece of material, or the beam-cut piece of material 204, or the section 208 of the beam-cut piece of material 204, or a remainder 206 of the beam-cut piece of material 204 by pressing the at least one part 202 of the beam-cut piece of material, or the beam-cut piece of material 204, or the section 208 of the beam-cut piece of material or a remainder 206 of the beam-cut piece of material against the ribs 904 (not necessarily against all ribs) of the rib structure 902.

Figure 12:
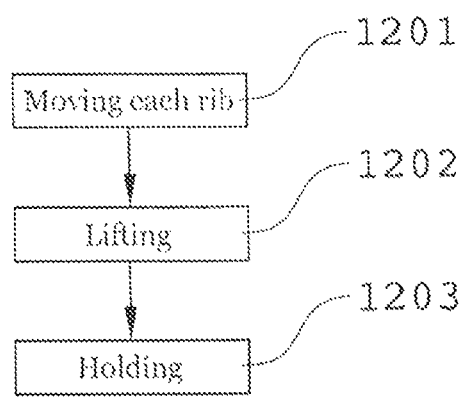
FIG. 12 is a flow diagram illustrating aspects of one of the methods according to the present invention.

With reference to FIG. 12, embodiments of a method for handling beam-cut parts cut out of a piece of material is illustrated, on a table 122 for holding a beam-cut piece of material 204 including at least one beam-cut part 202. The piece of material 204 is beam-cut in beam-cutting equipment 102. The table 122 comprises a holder 114 configured to hold a raster structure 120. The raster structure 120 is configured to hold the beam-cut piece of material 204 in a substantially horizontal plane 123, wherein the raster structure 120 comprises a plurality of raster sections 802, the raster sections comprising at least a plurality of members 804 extending substantially parallel to one another. The table 122 comprises a rib structure 904 movable in relation to the raster sections 802, the rib structure 904 comprising a plurality of ribs 904, wherein the method comprises the steps of:

Moving 1201 at least one of the plurality of ribs 904 between two neighbouring members 804 of the raster section 802;

Lifting 1202 the at least one part 202, or the beam-cut piece of material 204, or a section 208 of the beam-cut piece of material 204, or a remainder 206 of the beam-cut piece of material 204 from the resting position on the raster section 802 in a vertical direction substantially perpendicular to the horizontal plane 123 by means of the rib structure 902; and Holding 1203 the at least one part 202, or the beam-cut piece of material 204, or the section 208 of the beam-cut piece of material 204, or the remainder 206 of the beam-cut piece of material 204 by means of the rib structure 902.

The method may further comprise the steps of moving at least one of the plurality of ribs 904 between two neighbouring members 804 of the raster section 802 in a direction substantially perpendicular to the horizontal plane 123. The method may be characterized by moving a first rib 904 of the plurality of ribs 904 and a second rib 904 of the plurality of ribs in relation to one another. Further, the method may be characterized by moving the ribs 904 of the first group in a vertical direction 906 and in relation to the ribs 904 of the second group, and vertically lifting and holding the at least one part 202, or the beam-cut piece of material 204, or the section 208 of the beam-cut piece of material 204, or the remainder 206 of the beam-cut piece of material 204 by means of the first group. The method may further include the steps of vertically lifting and holding the at least one part 202, or the beam-cut piece of material 204, or the section 208 of the beam-cut piece of material 204, or the remainder 208 of the beam-cut piece of material 204 by means of the first group while letting the second group rest. The method may further include the step of vertically moving the second group upwards to a predetermined level vertically below the first group but vertically above the members 804 of the raster section 802 by means of the rib structure 902.

Figure 14:
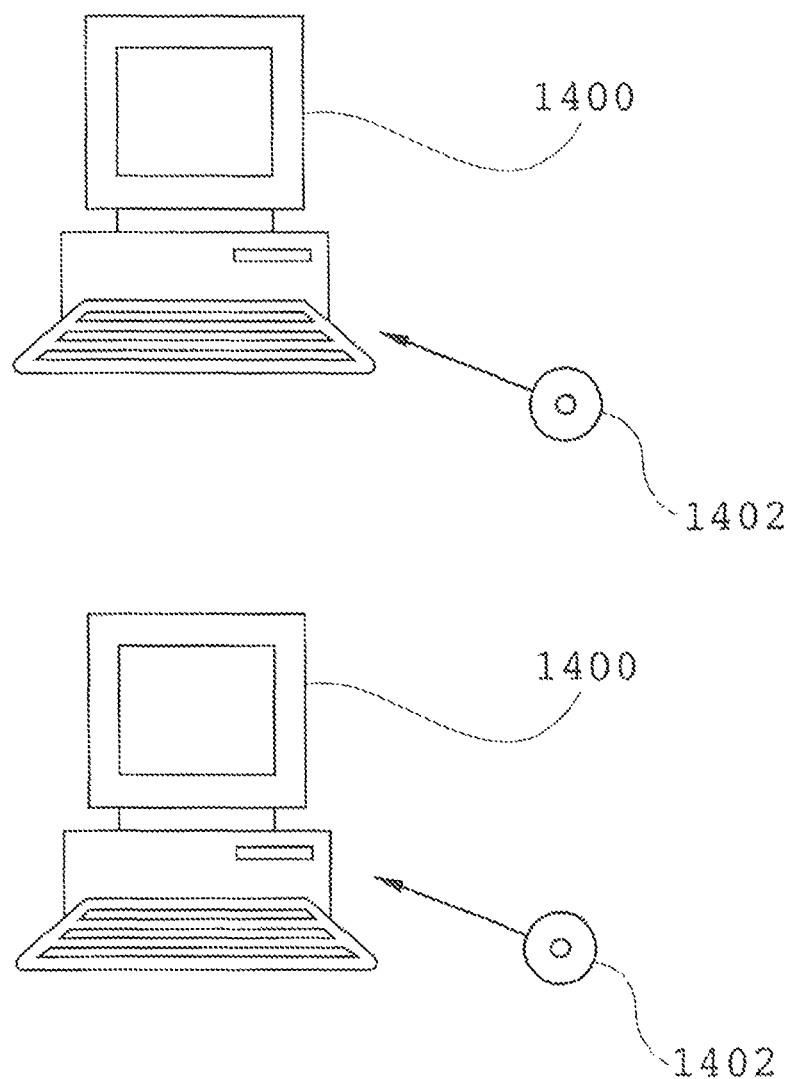
FIG. 14 is a schematic illustration of a computer program product.

The method may be characterized by magnetizing at least one rib 904. An advantageous step is to scrape off slag of the respective member 804 of the raster section 802 when moving at least one of the plurality of ribs 904 in relation to the respective member 804. According to aspects of the method, the ribs 904 are moved from below upwards before lifting the beam-cut piece of material 204, or the at least one part 202 of the beam-cut piece of material 204, or the section 208 of the beam-cut piece of material 204, or the remainder 206 of the beam-cut piece of material 204 from the resting position on the raster section. The beam-cut piece of material 204 may be fastened to the raster structure 120 or raster section 802 by means of fasteners 124. According to further aspects of the method, the method may be characterized by vertically moving the at least one pin 1102, e.g. a plurality of pins, in relation to the rib 904 and vertically moving the at least one part 202, or the beam-cut piece of material 204, or the section 208 of the beam-cut piece of material, or the 206 remainder of the beam-cut piece of material 204 in relation to the rib 904 and in relation to the beam-cut piece of material 204 or the at least one part 202, or the section 208 of the beam-cut piece of material 204, or the remainder 208 of the beam-cut piece of material In FIG. 14 there is disclosed a schematic diagram of some computer program products. Disclosed are n different digital computers $1400_1, \ldots, 1400_n$, wherein n is an integer. There is also disclosed n different computer program products $1402_1, \ldots, 1402_n$, here showed in the form of compact discs. The different computer program products $1402_1, \ldots, 1402_n$ are directly loadable into the internal memory of the n different digital computers $1400_1, \ldots, 1400_n$. Each computer program product $1402_1, \ldots, 1402_n$ comprises software code portions for performing some or all the steps disclosed above when the product(s) $1402_1 \ldots, 1402_n$ is/are run on said computer(s) $1400_1 \ldots, 1400_n$. Said computer program products $1402_1, \ldots, 1402_n$ can e.g. be in the form of floppy disks, RAM disks, magnetic tapes, opto magnetical disks or any other suitable products.

According to further aspects of the present invention, there is provided a non-transient computer-readable storage medium containing data representing coded instructions configured for execution by a processor of a computer, the instructions comprising the steps of a method as disclosed above or below. The computer-readable storage medium may comprise a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

It is to be understood that the number of parts 202 and the number of ribs 904 and members 804 may vary.

Gripping by means of a gripper as disclosed above. e.g. by means of a gripper in the form of a claw or a pair of pincers, does not correspond to the act of "pick and place" by way of vacuum or magnets.

The features of the different embodiments disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. A table (122) for holding a beam-cut piece of material (204) including at least one beam-cut part (202), the piece of material being beam-cut in beam-cutting equipment (102),
wherein the table (122) comprises a holder (114) configured to hold a raster structure (120), the raster structure (120) being configured to hold the beam-cut piece of material (204) in a substantially horizontal plane (123),
wherein the raster structure (120) comprises a plurality of raster sections (802), each raster section (802) comprising at least a plurality of members (804) extending substantially parallel to one another,
wherein the table (122) comprises a rib structure (902) movable in relation to the raster sections (802),
wherein the rib structure (902) comprises a plurality of ribs (904),
wherein at least one of the plurality of ribs (904) is movable between two neighbouring members (804) of the raster section (802),
wherein the rib structure (902) is configured to lift the at least one part (202), or the beam-cut piece of material (204), or a section (208) of the beam-cut piece of material including at least one part of the beam-cut piece of material, or a remainder (206) of the beam-cut piece of material from a resting position on the raster section (802) in a vertical direction (906) substantially perpendicular to the horizontal plane (123), and
wherein the rib structure (904) is configured to hold the at least one part (202), or the beam-cut piece of material (204), or the section (208) of the beam-cut piece of material, or the remainder (206) of the beam-cut piece of material.

2. A table (122) according to claim 1, wherein the rib structure (902) is configured to move the ribs (904) from below upwards before lifting the beam-cut piece of material (204), or the at least one part (202) of the beam-cut piece of material, or the section (208) of the beam-cut piece of material, or the remainder (206) of the beam-cut piece of material from the resting position on the raster section (802).

3. A table (122) according to claim 2, wherein the plurality of ribs (904) comprises at least one first rib (904) and at least one second rib (904), and
wherein the first and second ribs (904) are vertically movable in relation to one another.

4. A table (122) according to claim 2, wherein at least one rib (904) is configured to be magnetized and become magnetic.

5. A table (122) according to claim 2, wherein at least one rib (904) comprises at least one pin (1102) extending substantially transversely to the longitudinal extension of the rib and vertically movable in relation to the rib (904), and
wherein the pin (1102) is arranged to vertically move the at least one part (202), or the beam-cut piece of material (204), or the section (208) of the beam-cut piece of material, or the remainder (206) of the beam-cut piece of material in relation to the rib and in relation to the beam-cut piece of material, the at least one part, the section of the beam-cut piece of material or the remainder of the beam-cut piece of material.

6. A system (104) for handling beam-cut parts (202) cut out of a piece of material (204),
wherein the system comprises a table (122) as claimed in claim 2,
wherein the system (104) comprises at least one gripping robot (106, 108) having a gripper (110, 112) configured to be controlled by the at least one robot,
wherein the gripping robot (106, 108) is configured to grip the at least one part (202), or the beam-cut piece of material (204), or the section (208) of the beam-cut piece of material, or the remainder (206) of the beam-cut piece of material when the beam-cut piece of material, the section of the beam-cut piece of material, the remainder of the beam-cut piece of material or the at least one part is held by ribs (904) of the rib structure (902).

7. A table (122) according to claim 1, wherein the plurality of ribs (904) comprises at least one first rib (904) and at least one second rib (904), and
wherein the first and second ribs (904) are vertically movable in relation to one another.

8. A table (122) according to claim 1, wherein the plurality of ribs (904) is grouped into at least a first group of a plurality of ribs (904) and a second group of a plurality of ribs (904),
wherein the ribs (904) of the first group are vertically movable in relation to the ribs (904) of the second group, and
wherein the rib structure (902) is configured to vertically lift and hold the at least one part (202), or the beam-cut piece of material (204), or the section (208) of the beam-cut piece of material, or the remainder (206) of the beam-cut piece of material by means of the first group.

9. A table (122) according to claim 8, wherein the rib structure (902) is configured to vertically lift and hold the at least one part (202), or the beam-cut piece of material (204), or the section (208) of the beam-cut piece of material, or the remainder (206) of the beam-cut piece of material by means of the first group while letting the second group rest.

10. A table (122) according to claim 9, wherein the rib structure (902) is configured to vertically move the second group upwards to a predetermined level vertically below the first group but vertically above the members (804) of the raster section (802).

11. A table (122) according to claim 8, wherein the rib structure (902) is configured to vertically move the second group upwards to a predetermined level vertically below the first group but vertically above the members (804) of the raster section (802).

12. A table (122) according to claim 1, wherein at least one rib (904) is configured to be magnetized and become magnetic.

13. A table (122) according to claim 1, wherein at least one of the plurality of ribs (904) is configured to scrape off slag of the respective member (804) of the raster section (802) when being moved in relation to the respective member (804).

14. A table (122) according to claim 1, wherein at least one of the plurality of ribs (904) has at least one corner (908) configured to scrape off slag of the respective member (804), and wherein the corner is made of a material which is harder than the material of the rest of the rib (904).

15. A table (122) according to claim 1, wherein the table (122) comprises a rib structure robot (130) configured to control and guide the rib structure (904).

16. A table (122) according to claim 1, wherein the table (122) comprises fasteners (124) for fastening the beam-cut piece of material (204) to the raster structure (120) or section (802).

17. A table (122) according to claim 1, wherein at least one rib (904) comprises at least one pin (1102) extending substantially transversely to the longitudinal extension of the rib and vertically movable in relation to the rib (904), and wherein the pin (1102) is arranged to vertically move the at least one part (202), or the beam-cut piece of material (204), or the section (208) of the beam-cut piece of material, or the remainder (206) of the beam-cut piece of material in relation to the rib and in relation to the beam-cut piece of material, the at least one part, the section of the beam-cut piece of material or the remainder of the beam-cut piece of material.

18. A system (104) for handling beam-cut parts (202) cut out of a piece of material (204), wherein the system comprises a table (122) as claimed in claim 1, wherein the system (104) comprises at least one gripping robot (106, 108) having a gripper (110, 112) configured to be controlled by the at least one robot, wherein the gripping robot (106, 108) is configured to grip the at least one part (202), or the beam-cut piece of material (204), or the section (208) of the beam-cut piece of material, or the remainder (206) of the beam-cut piece of material when the beam-cut piece of material, the section of the beam-cut piece of material, the remainder of the beam-cut piece of material or the at least one part is held by ribs (904) of the rib structure (902).

19. A method for handling beam-cut parts cut out of a piece of material, on a table for holding a beam-cut piece of material including at least one beam-cut part, wherein the piece of material is beam-cut in beam-cutting equipment, wherein the table comprises a holder configured to hold a raster structure, the raster structure being configured to hold the beam-cut piece of material in a substantially horizontal plane, wherein the raster structure comprises a plurality of raster sections, the raster sections comprising at least a plurality of members extending substantially parallel to one another, wherein the table comprises a rib structure movable in relation to the raster sections, and wherein the rib structure comprises a plurality of ribs, wherein the method comprises:

moving (1201) at least one of the plurality of ribs between two neighbouring members of the raster section;

lifting (1202) the at least one part, or the beam-cut piece of material, or a section of the beam-cut piece of material, or a remainder of the beam-cut piece of material from the resting position on the raster section in a vertical direction substantially perpendicular to the horizontal plane by means of the rib structure; and holding (1203) the at least one part, or the beam-cut piece of material, or the section of the beam-cut piece of material, or the remainder of the beam-cut piece of material by means of the rib structure.

20. At least one computer program product (1402$_1$, . . . , 1402$_n$) directly loadable into the internal memory of at least one digital computer (1400$_1$, . . . , 1400$_n$), comprising software code portions for performing the steps of the method according to claim 19 when said at least one product (1402$_1$, . . . , 1402$_n$) is/are run on said at least one computer (1400$_1$, . . . , 1400$_n$).

* * * * *